(12) United States Patent
Kearns et al.

(10) Patent No.: US 7,689,938 B2
(45) Date of Patent: Mar. 30, 2010

(54) GRAPHICAL CALCULATOR WITH HIERARCHICAL VIEW OF USAGE HISTORY

(76) Inventors: David Kearns, 4096 Orchard Way, Lake Oswego, OR (US) 97035; Geetha Pannala, 8332 SW. Langtree St., Tigard, OR (US) 97224

( * ) Notice: Subject to any disclaimer, the term of this patent is extended or adjusted under 35 U.S.C. 154(b) by 1257 days.

(21) Appl. No.: 10/309,528

(22) Filed: Dec. 3, 2002

(65) Prior Publication Data
US 2004/0104945 A1  Jun. 3, 2004

(51) Int. Cl.
*G06F 15/00* (2006.01)
(52) U.S. Cl. .......................... 715/854; 715/773
(58) Field of Classification Search ......... 715/964–967, 715/771–773, 765–767, 769, 790–794, 853–854, 715/802, 804, 805, 855
See application file for complete search history.

(56) References Cited

U.S. PATENT DOCUMENTS

| | | | |
|---|---|---|---|
| 5,046,024 A | | 9/1991 | Smith et al. |
| 5,199,103 A | | 3/1993 | Smith et al. |
| 5,819,248 A | * | 10/1998 | Kegan .......................... 706/45 |
| 6,421,571 B1 | * | 7/2002 | Spriggs et al. ................ 700/17 |
| 6,484,190 B1 | * | 11/2002 | Cordes et al. ................ 715/514 |
| 6,610,106 B1 | * | 8/2003 | Jenks .......................... 715/538 |
| 6,788,319 B2 | * | 9/2004 | Matsumoto et al. ......... 715/841 |
| 2002/0054141 A1 | * | 5/2002 | Yen et al. ..................... 345/804 |
| 2002/0059210 A1 | * | 5/2002 | Makus et al. ................. 707/3 |
| 2003/0028269 A1 | * | 2/2003 | Spriggs et al. ................ 700/83 |
| 2003/0088533 A1 | * | 5/2003 | Fortenberry et al. .......... 706/47 |
| 2004/0210568 A1 | * | 10/2004 | Makus et al. ................. 707/3 |

* cited by examiner

*Primary Examiner*—Steven P Sax
(74) *Attorney, Agent, or Firm*—Klarquist Sparkman, LLP

(57) ABSTRACT

A calculator having a hierarchical tree view (HTV) window provides a more efficient method of displaying calculator usage history. The HTV window provides tabs to choose between multiple windows displaying usage history such that more information can be displayed quickly without using more display area than is necessary. The HTV window also provides a view of usage such that expressions listed in the HTV window can quickly be expanded or unexpanded by the user in order to see data associated with that expression. Tool tip information may be provided to the user, displayed expressions may be re-used by double-clicking or dragging and dropping operations, expressions may be grouped into user-defined folders, and symbols may be used for easy identification of expressions, results, or folders. Additionally, usage history may be stored into a file, files may be opened for the purpose of re-using such usage history at a subsequent time, and scripts and functions may be created, executed, and saved for subsequent use.

49 Claims, 17 Drawing Sheets

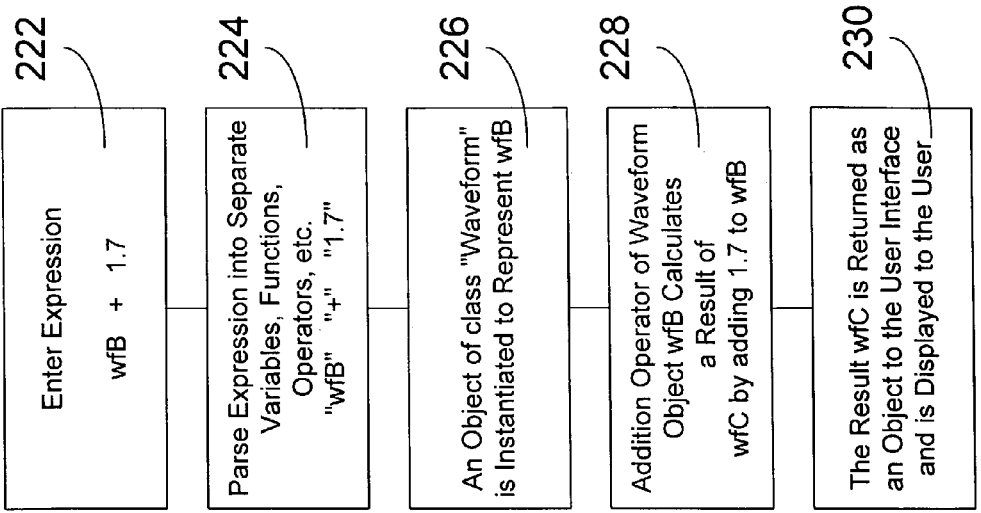
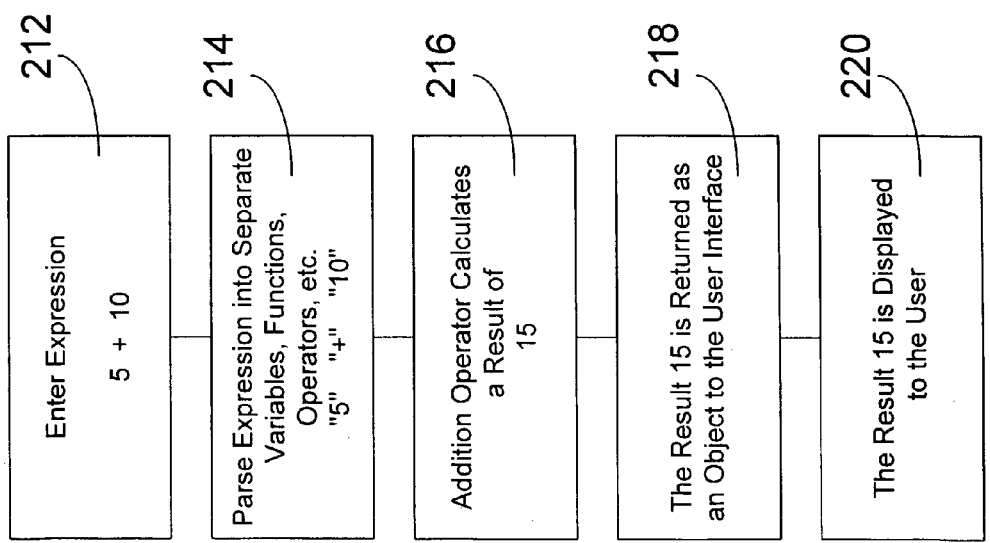

GRAPHICAL CALCULATOR WITH HIERARCHICAL VIEW OF USAGE HISTORY

TECHNICAL FIELD

The following invention relates to both electronic calculators and computer-implemented calculators, and more particularly, to displaying a usage history of a calculator in a hierarchical manner.

BACKGROUND

Waveform calculators are often used in conjunction with waveform analyzers in the aerospace and electronics industries in order to design and test the behavior of electrical circuits. The waveform calculator may be used to create, view, edit, or perform mathematical operations on signals. The waveform analyzer is then used to fine tune, test, scale or simulate the waveform for the specific needs of the user.

Current waveform calculators provide the user with a user interface for entering expressions, an expression-entry window, and a results window. The user interface usually provides buttons or keys in order to enter numerals, variables, equations, operations, etc. The expression-entry window displays the entered expression, and the results window displays the result of the computation done by the calculator using the expressions entered by the user.

Due to the nature of circuit design and testing, a user often must input numerous expressions, perform numerous computations, and view numerous results while using a waveform calculator. The numerous results, computations and expressions become cumbersome and difficult to organize on current waveform calculators because of the scrolling design of current results windows and limitations on the amount of display area that can be used for displaying information. Users must scroll through numerous results to find a desired result and often do not recall what operation or what expressions were used to obtain that result. These problems force a user to make many repetitive expression entries and calculations that would be unnecessary with a more effective and efficient method of displaying the calculator usage history.

SUMMARY

A calculator having a hierarchical tree view (HTV) window is described herein that provides a more effective and efficient method of displaying calculator usage history that does not suffer from the problems presented by current waveform calculators. The HTV window provides organization and efficient use of screen space and provides a unique method of allowing the user to quickly see which expression was used to calculate a given result. The HTV window may also represent differently various types of data, such as operands, results, waveforms, variables, etc.

The HTV window may also provide tabs to choose between multiple windows displaying usage history. Providing tabs in the HTV window allows the user to quickly access different windows (e.g. results, variables, functions, and expressions) of usage history using limited display area.

The HTV window may also allow usage history to be expanded or unexpanded to see further information about the history. For example, results can be provided with an adjacent + or other suitable symbol so that the user may expand the result into a tree with the lower branches listing the expressions used to obtain the result. The tree may be expanded to list just the result in order to efficiently use the display area. This method of expansion and unexpansion is also used to show the value, function, or expression associated with a listed variable.

The HTV window may also provide tool tip information to the user. For example, instead of expanding the result into a tree, the user may simply place a cursor over the result or select the result in some fashion and a temporary window appears showing the expression and operation used to obtain the result. The window then disappears once the cursor is moved or the result unselected. This display method is also used for showing the value, function, or expression associated with a listed variable.

The HTV window may also provide the user of a calculator the ability to quickly find a result and re-use it. This is done by finding a desired result and double-clicking it, dragging and dropping it, or in some other way identifying it such that it is copied to the expression-entry window without having to manually enter the result through the user interface. The user may also re-use an expression, operation, function, variable, waveform, etc.

The HTV window may also provide more effective organization of the displayed usage history by allowing for results of similar types to be grouped in user-defined folders. For example, all waveforms can either automatically or manually be placed in one folder, numerical results in another, functions in another, and variables in still another. Symbols may also be used for easy identification of expressions, results or folders, such as using a "∿" symbol for a variable representing a waveform or a folder containing waveforms.

The HTV window also provides the user with the ability to store usage history into a file and open files for the purpose of re-using such usage history at a subsequent time. Scripting and function calling may be used to quickly access a series of calculations or repetitively use complex or time-intensive operations.

These and other aspects will become apparent from the following detailed description, which makes references to the accompanying drawings.

DETAILED DESCRIPTION

A calculator having a HTV window described herein encompasses methods and systems that provide a user with an improved display showing a usage history in hierarchical format. The following figures and explanations refer to a computer-implemented waveform calculator to illustrate the features of the invention. However, this is only one embodiment and should not be construed to limit the scope of the invention. Hereafter, the term expression refers to any symbol, character, numeral, etc., or combination thereof, that represents a quantity or relationship between quantities to be used to compute a result. A result refers to the product of computation performed on an expression or number of expressions.

Figure 1:
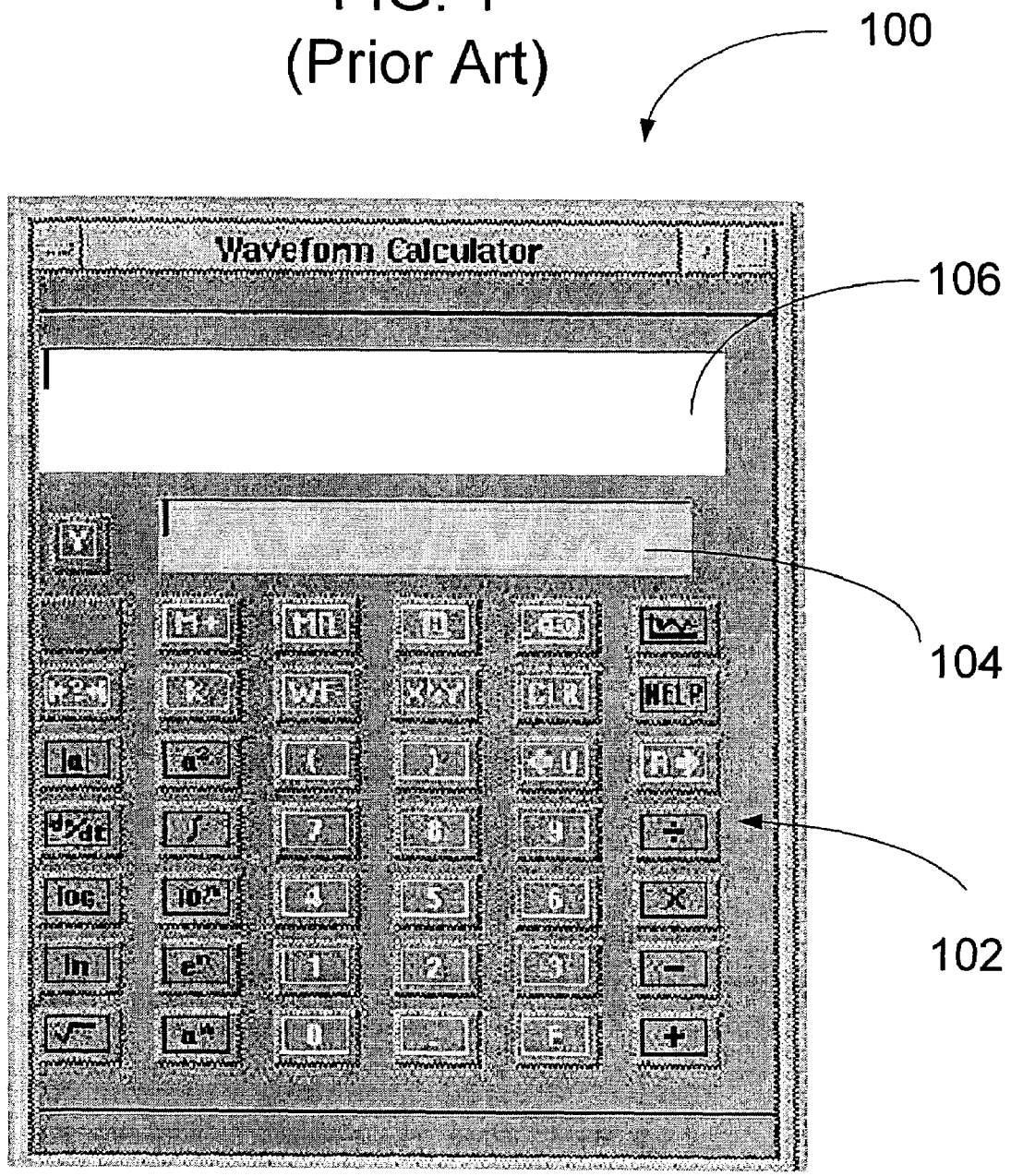
FIG. 1 is an example of a waveform calculator typical of the prior art.

FIG. 1 shows a computer-implemented waveform calculator 100 typical of the prior art. The calculator provides a user interface 102 for the user to enter expressions, an expression-entry window 104 to display expressions being entered by the user, and a results window 106 to show expressions entered into the calculator and the calculated results. Typically, the results window 106 provides some method, such as scrolling, for the user to view results and expressions listed therein.

Figure 2:
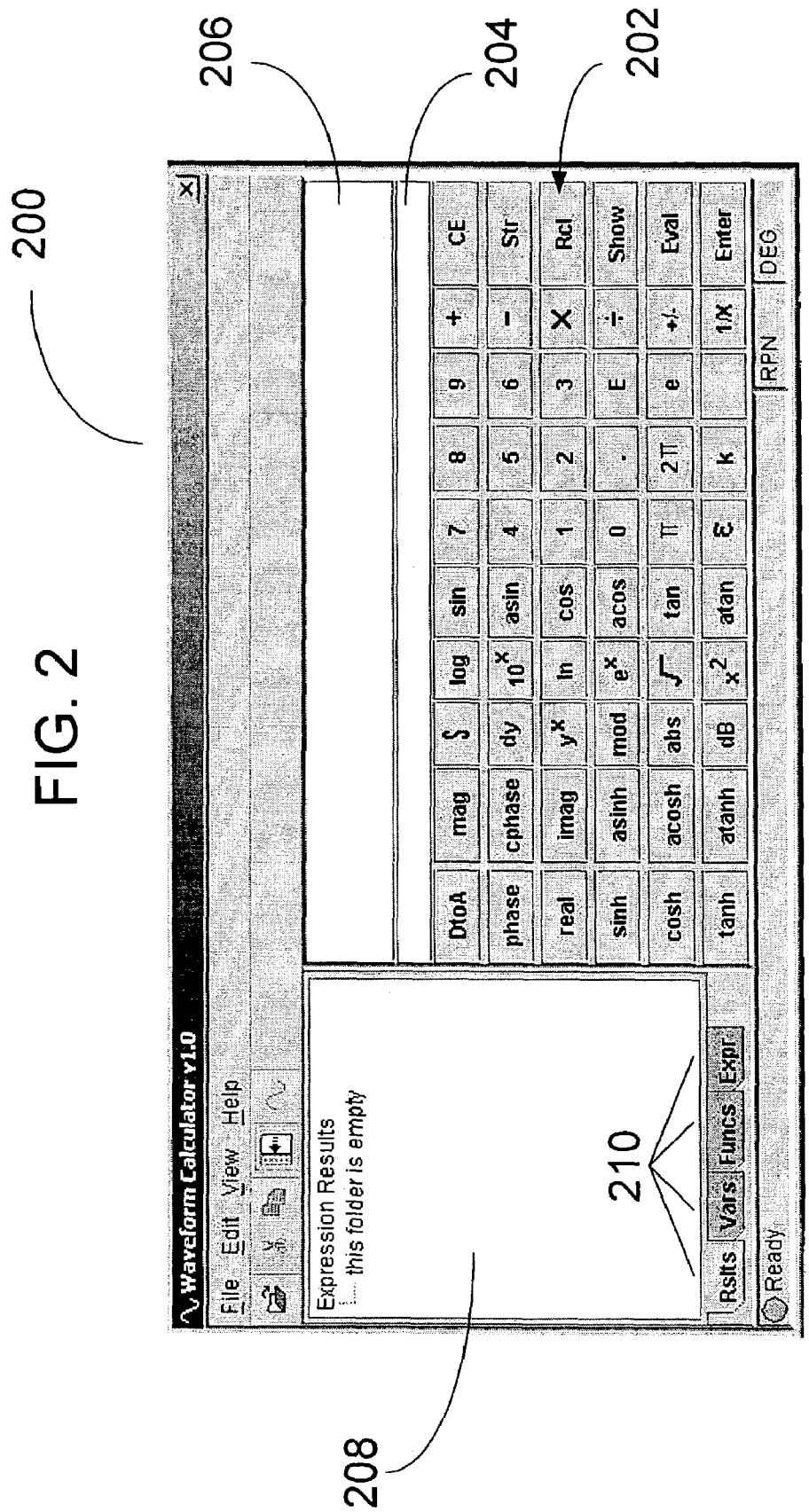
FIG. 2 is a waveform calculator having a HTV window.

FIG. 2 shows a computer-implemented waveform calculator 200 with an improved display. The calculator provides a user interface 202 for the user to enter expressions, an expression-entry window 204 to show the entered expressions being entered by the user, and a results window 206 to show expressions and the results of the expressions. The calculator also provides a HTV window 208 for displaying the results, as well as numerous other types of usage data, in a hierarchical-tree format. The HTV window 208 also provides tabs 210 allowing the user to quickly switch between windows containing different categories of data.

The calculator in FIG. 2 is implemented such that the user interface interacts with an expression-evaluation system, or interpreter, which executes operations on an expression and returns a result. In this embodiment, the interpreter is implemented using Jython, a Java interpretation of Python released under the GNU free documentation license, which is an object-oriented scripting language that functions on a variety of different computing platforms. However, one of skill in the art recognizes that there are a number of different possible programming languages that may be used to implement the interpreter.

FIG. 2(a) shows a data flow chart as the expression 5+10 is entered, by way of example. The expression is displayed in an expression-entry window 204 until the user presses an execute key, enter key, or similar key indicating the expression being entered is complete as shown at 212. The expression, represented in a text format (e.g. ASCII), is then passed internally to the interpreter. The interpreter parses the expression entered to distinguish and separate the various variables, functions, operators, etc. as shown at 214. The interpreter then determines whether it can complete the request or whether a user-defined class is necessary. For the purposes of this example, no user-defined class is necessary because the Jython interpreter can complete basic mathematical operations such as addition. Thus at 216, the operands 5 and 10 are passed to an addition operator where the value of 15 is calculated. The value 15 is returned as an object to the user interface as shown at 218, which can readily identify that the object represents an integer returning a value of 15. The user interface then displays the value 15 as shown at 220.

Likewise, the data flow chart in FIG. 2(b) shows processing the addition of 1.7 to a waveform B (wfB). The expression wfB+1.7 is first entered as shown at 222. The expression is then passed from the user interface to the interpreter, where it is parsed to distinguish wfB, +, and 1.7 as shown at 224. Next, the Jython interpreter determines that it cannot complete the request because it does not contain an operator associated with waveforms. Therefore, a user-defined class called waveform is provided that defines objects with operators to perform mathematical operations on a waveform. The interpreter recognizes that one of the parsed expressions is a waveform, wfB, and therefore instantiates an object of class "waveform" to represent wfB, as shown at 226. The object representing wfB is passed the + operator and constant 1.7 so that the instantiated object performs the desired operation. The object then calls the addition operator such that 1.7 is added to wfB to form the result wfC, as shown at 228. This waveform is returned as an object of class waveform to the interpreter, which in turn passes it on to the user interface. The user interface recognizes the returned object as a waveform wfC and displays it accordingly as shown at 230.

Figure 3:
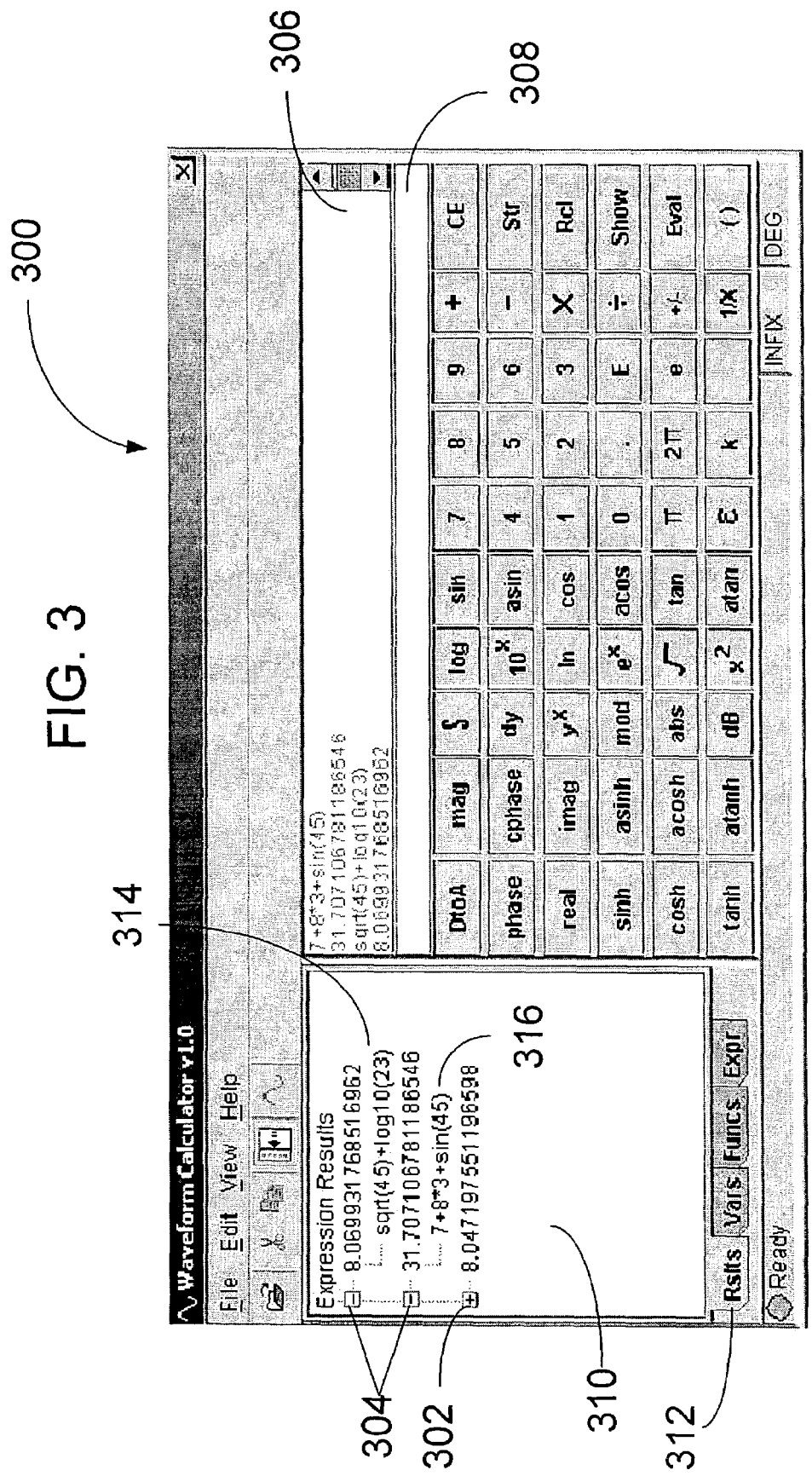
FIG. 3 is a waveform calculator with usage history being displayed in a hierarchical tree format.

FIG. 3 shows a waveform calculator 300 with results of recent calculations being shown both in the results window 306 and in a HTV window 310. The results window 306 lists the expressions entered into the expression-entry window 308 and the results of the calculations performed on those entries. However, after numerous operations it is difficult to quickly find a result among the many using the scroll function and likewise difficult to distinguish the results from the expressions.

However, the information displayed in the HTV window 310 does not suffer from the same infirmities as the results windows 306. Specifically, the HTV window 310 is structured as a hierarchical tree with results displayed on parent levels of the tree and expressions associated with the results on sub-levels of the tree. For example, the results of 8.069931768516962, 31.707106781186546, and 8.047197551196598 are shown on the parent level when the results tab 312 is selected. Buttons 302, 304 adjacent the results allow a result to be expanded or collapsed.

In this embodiment, button 302 has a "+" sign indicating the result is currently unexpanded. Likewise, buttons 304 containing a "−" sign are expanded to show sub-levels (i.e. expressions) of the tree. The result 8.069931768516962 has been expanded to show the expression 314 associated with it. In this case, the expression is sqrt(45)+log 10(23). Likewise, the result 31.707106781186546 has been expanded such that the expression 316, 7+8*3+sin(45), is readily identified as the expression used to calculate the result. Thus, the hierarchical tree format allows expressions and results to be easily organized and associated together.

Figure 4:
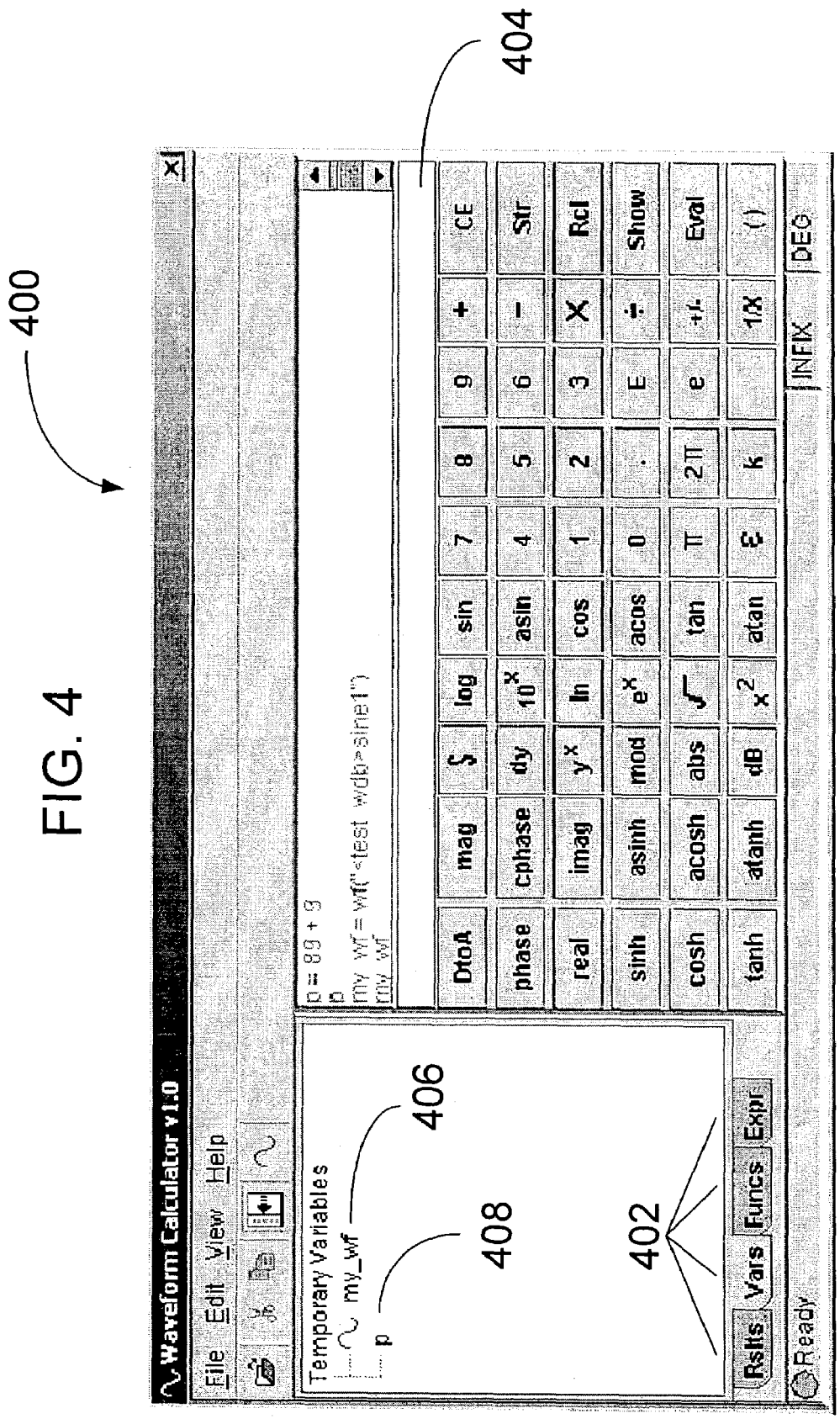
FIG. 4 is a waveform calculator with a HTV window using tabs to organize usage history.

FIG. 4 shows another embodiment of a waveform calculator 400 with a HTV window having tabs 402 to organize usage history. In this illustrated embodiment, the tabs organize data by results (Rslts), variables (Vars), functions (Funcs), and expressions (Expr). Other combinations of tabs may easily be used. Each tab organizes the hierarchical tree in a different format with different usage information being a parent and different child usage information. For example, in FIG. 4, the variables tab is shown displaying the variables assigned in the expression-entry window 404. A waveform named my_wf 406 is shown along with a variable represented by the character p 408.

Figure 5:
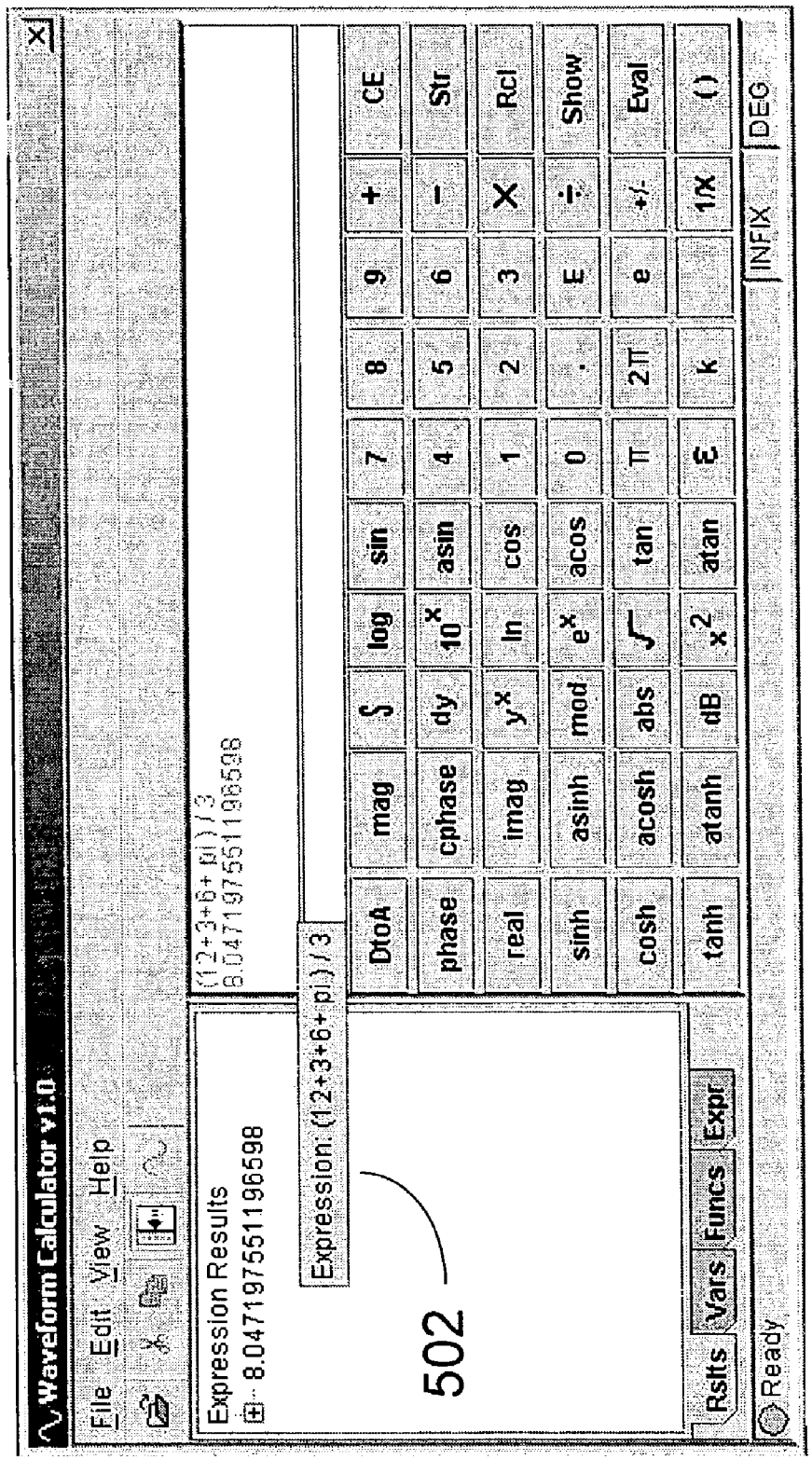
FIG. 5 is a waveform calculator with a HTV window using a tool tip to show the expression associated with the selected result.

FIG. 5 shows another embodiment of a waveform calculator 500 using a tool tip 502 as an alternative to expanding the hierarchical tree view of an expression. First, the result 8.047197551196598 is pointed at, or passed over, using a pointer such as a computer "mouse." Once the result is pointed at, information associated with the result is displayed in a pop-up display box. For example, the expression (12+3+6+pi)/3 is displayed as being associated with result 8.047197551196598. The length of time the box is displayed may be dependent on how long the result is pointed at or for a pre-set length of time.

Figure 6:
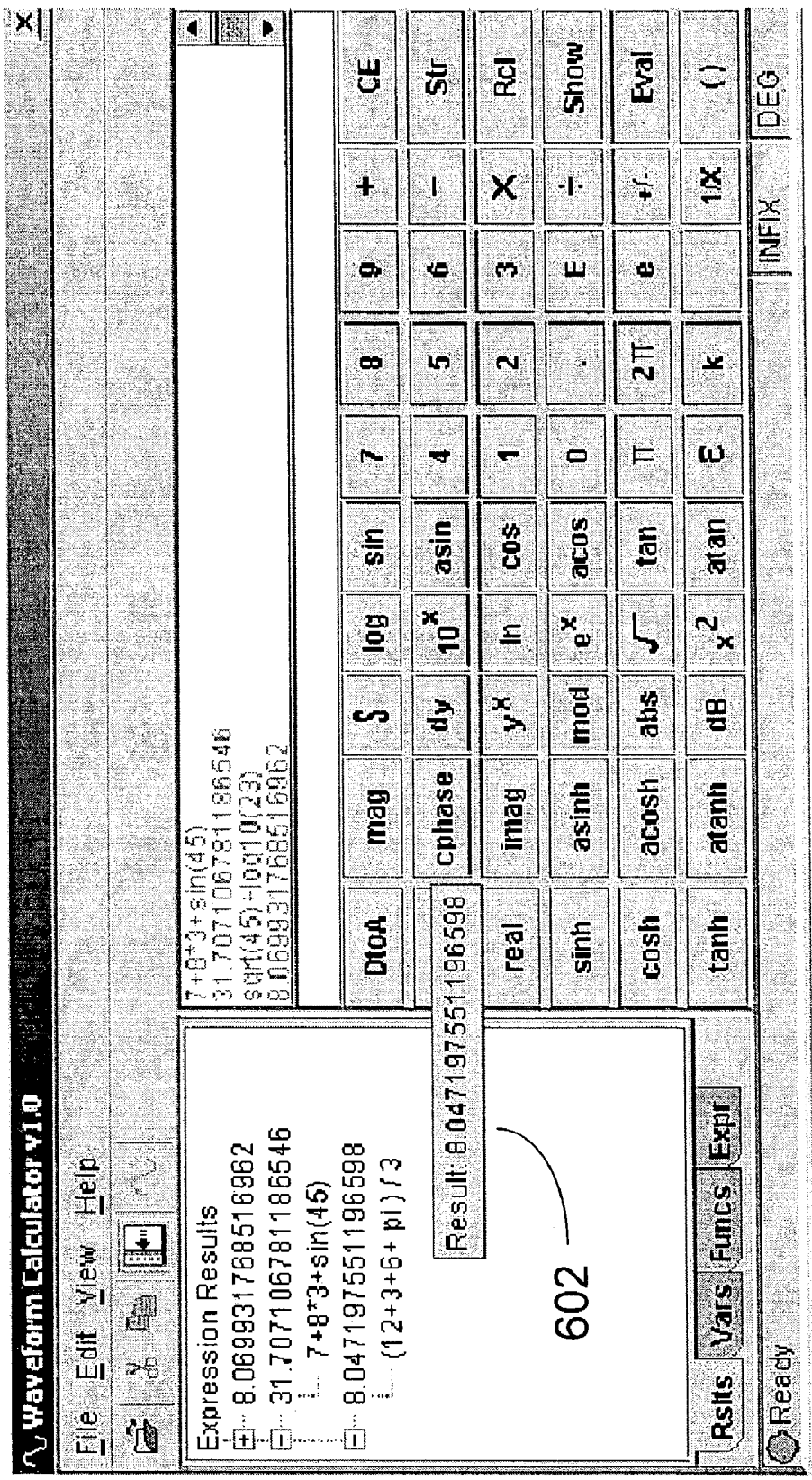
FIG. 6 is a waveform calculator with a HTV window using a tool tip to show the result associated with the selected expression.

FIG. 6 shows another embodiment of a waveform calculator 600 wherein the hierarchical tree view is already expanded such that the expression, (12+3+6+pi)/3, used to calculate the result 8.047197551196598 is shown. The tool tip 602 is used to show data associated with the expression. In this case the result 8.047197551196598 is displayed. Thus, the tool tip 602 may be used to show further information about results or expressions.

Figure 7:
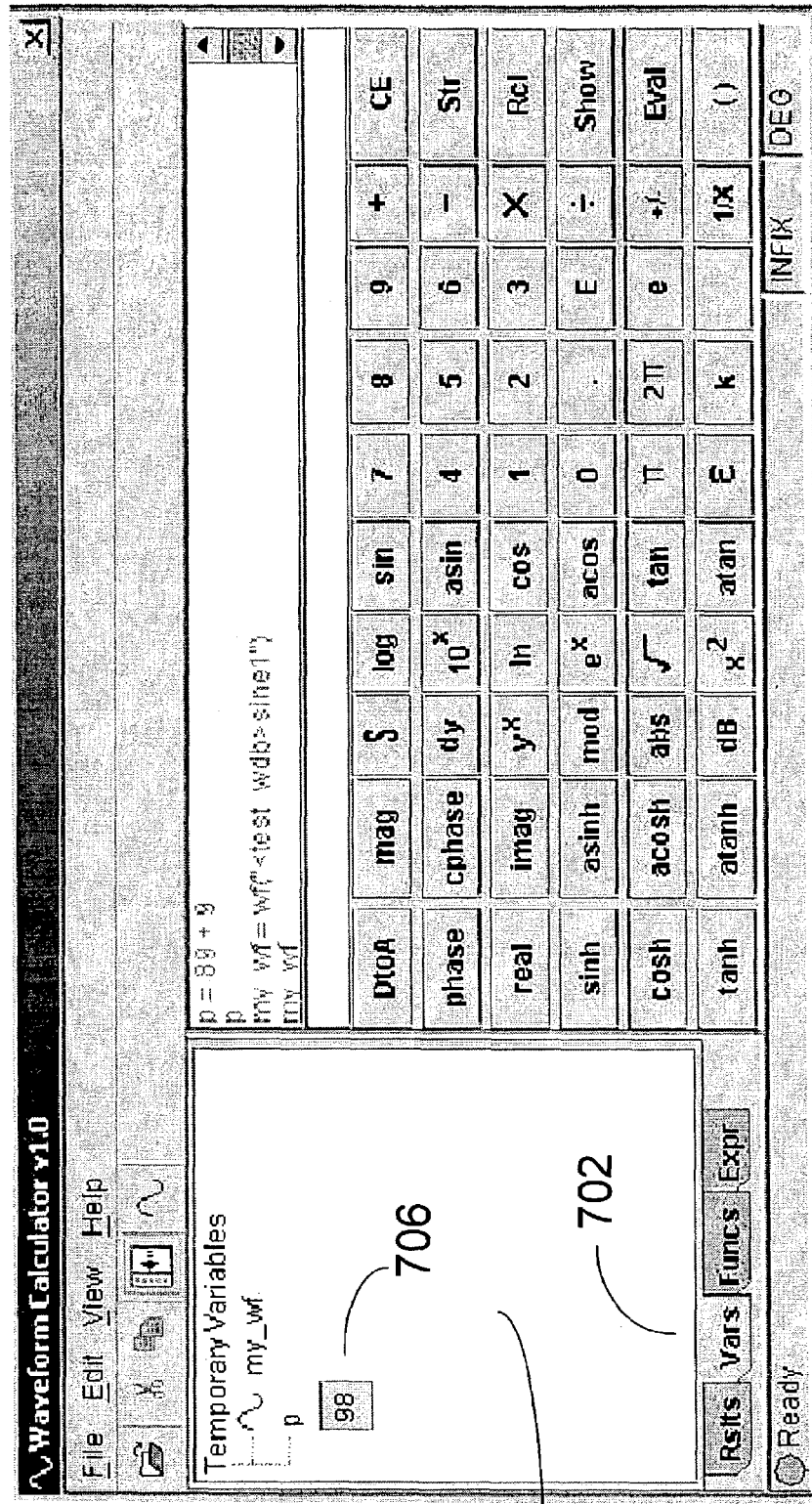
FIG. 7 is a waveform calculator with a HTV window using a tool tip to show the current value associated with the selected variable.

FIG. 7 shows a waveform calculator 700 using the tool tip function with the "vars" tab 702 selected. Here, the variable tab 702 has been chosen from the tabs displayed at the bottom of the HTV window 704 and the variable p as shown previously in FIG. 4 is pointed at by the user. In response, a tool tip 706 is displayed showing data associated with the variable. In this case, the tool tip 706 shows the current value, 98, assigned to the variable. Thus, by pointing at the variable further information about the variable is displayed through a pop-up window.

Figure 8:
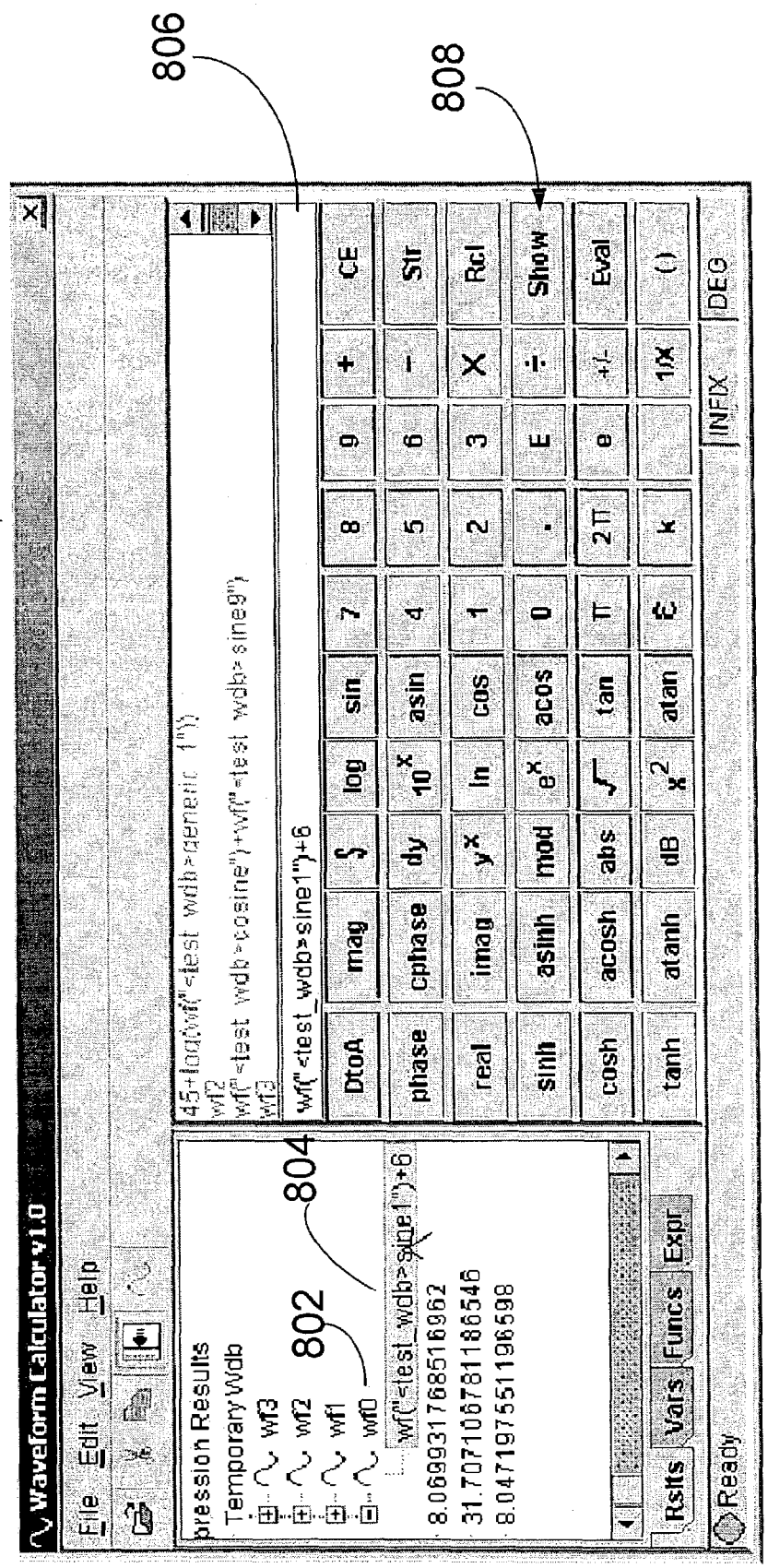
FIG. 8 illustrates double-clicking on an expression to copy the expression from the HTV window to the expression-entry window.

FIG. 8 shows another embodiment of a waveform calculator 800 using a HTV window, wherein previously-evaluated expressions can be quickly selected to enter the expression into the expression-entry window 806. Thus, the user does not have to manually enter the expression again using the user interface 808. FIG. 8 shows a name 802 associated with a waveform as a parent level of the hierarchy. The current definition of the named waveform is also displayed at 804 as a child within the hierarchy. Double-clicking the expression 804 copies it into the expression-entry window 806.

Figure 9:
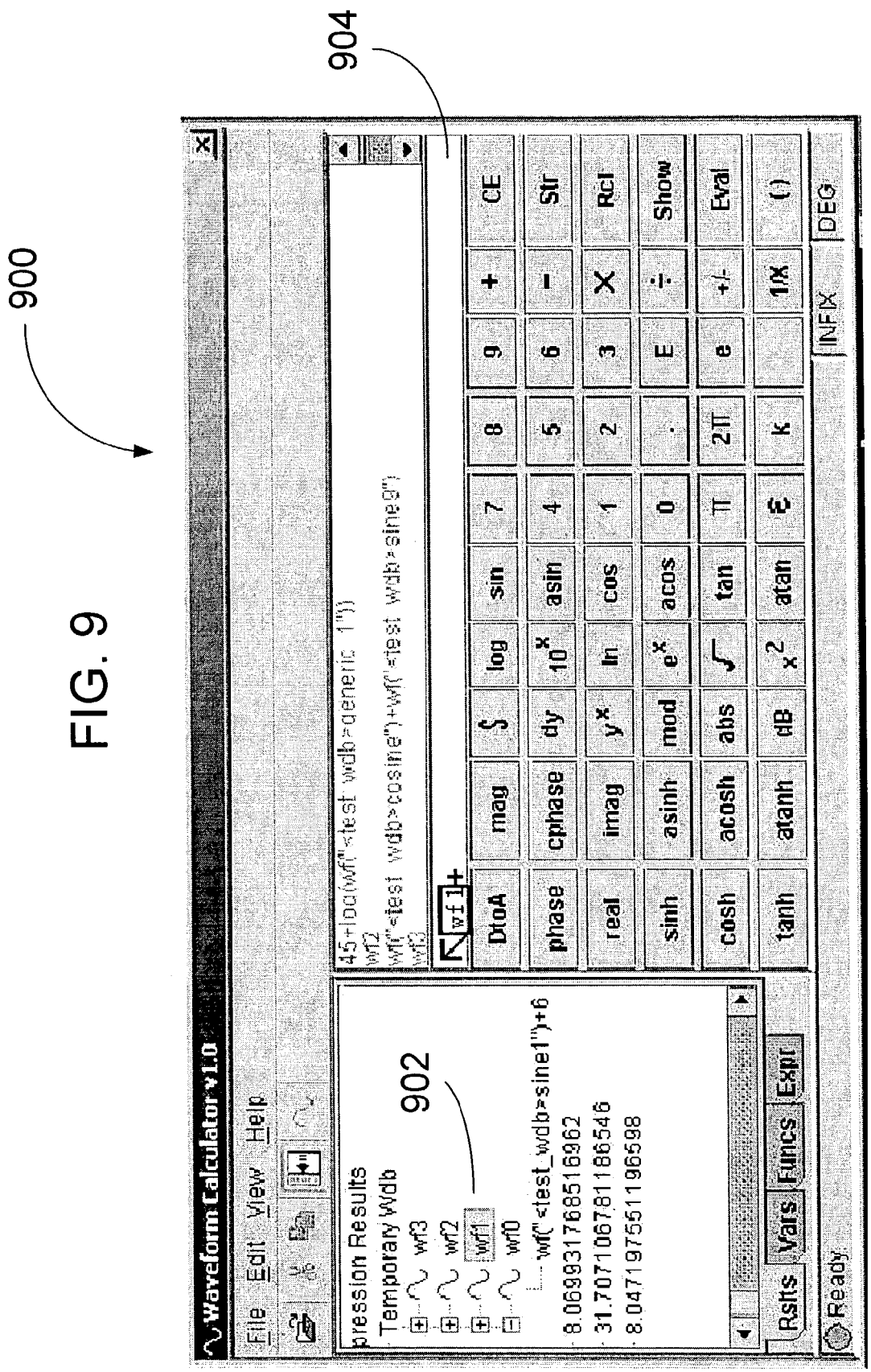
FIG. 9 illustrates that a variable can be dragged and dropped from the HTV window to the expression-entry window.

FIG. 9 shows another method for entering a displayed expression 902 into the expression-entry window 902. In this embodiment, the waveform calculator 900 allows the user to drag a waveform, wf1, from the HTV window and drop it into the expression-entry window 904 for use in a subsequent calculation.

Figure 10:
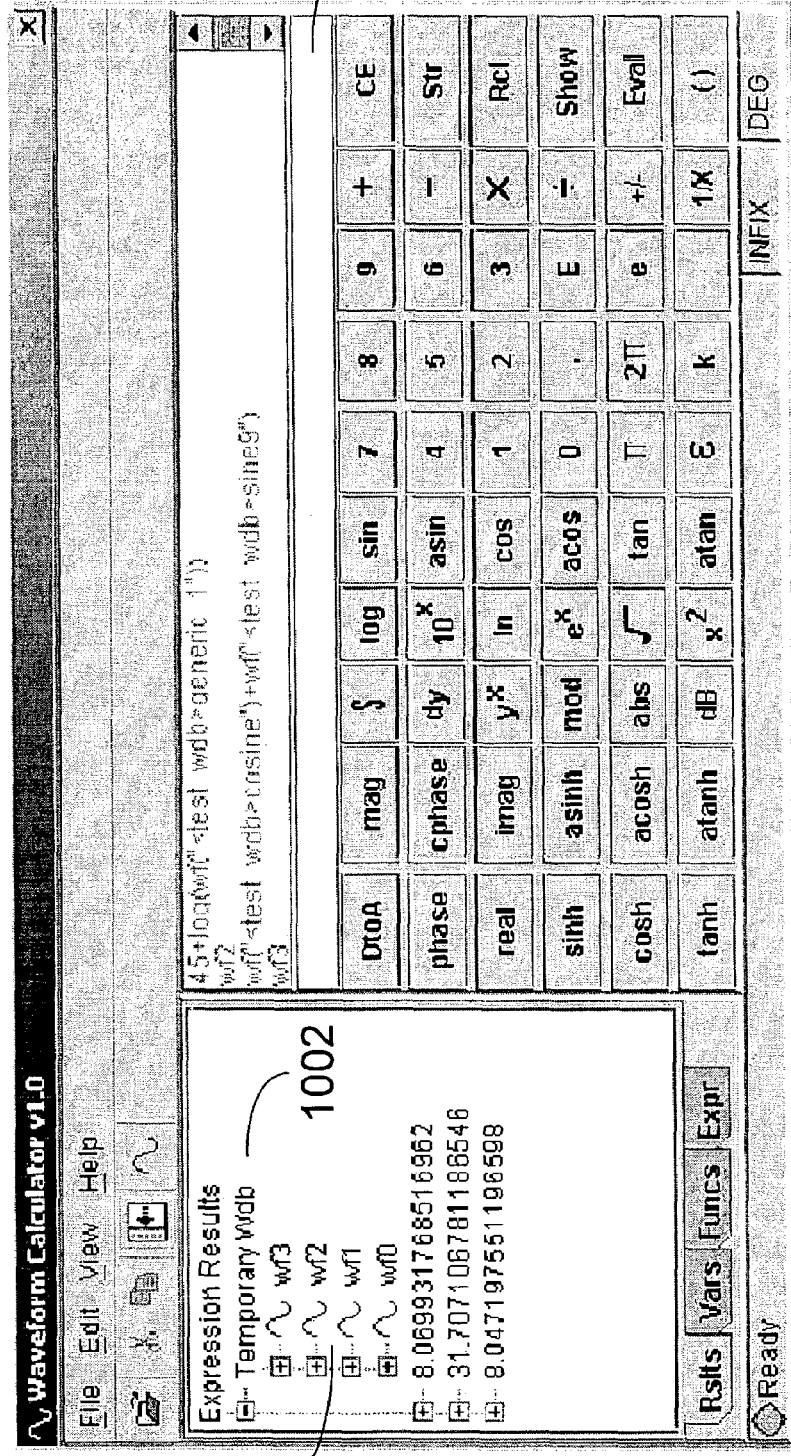
FIG. 10 is a waveform calculator using both user-defined folders and symbols to organize results in the HTV window.

FIG. 10 shows a waveform calculator 1000 with a HTV window that also allows for user-customizable organization of data within each individual tabbed window. FIG. 10 shows two possible methods of accomplishing such organization. First, the data can be organized into folders. For instance, the folder "Temporary Wdb" 1002 can contain any number of temporary waveforms. Folders can both be manually created by the user or can be automatically created when a certain result is of a specified type. For instance, the folder "Temporary Wdb" 1002 could be created automatically in response to a waveform result and the waveform result automatically placed in the folder 1002. Subsequent waveform results may also be automatically added to the waveform folder 1002. This has the advantage of being able to keep a large amount of expressions under one folder such that only one line of the window is used until the user wishes to view the data contained therein. At that point, the user simply expands the folder to view its contents. Additionally, the user can create a "favorites" or similar folder to keep expressions used often for quick retrieval and entry into the expression-entry window 1004 through either the double-click or drop and drag features.

Second, the expression or folders shown in the display window can be associated with symbols for easy identification. For instance, FIG. 10 also shows small waveform-shaped symbols 1006 adjacent each of the waveforms displayed in the expanded "Temporary Wdb" folder 1002 shown in the HTV window. This helps the user quickly, visually identify data as being of a certain data type.

Figure 11:
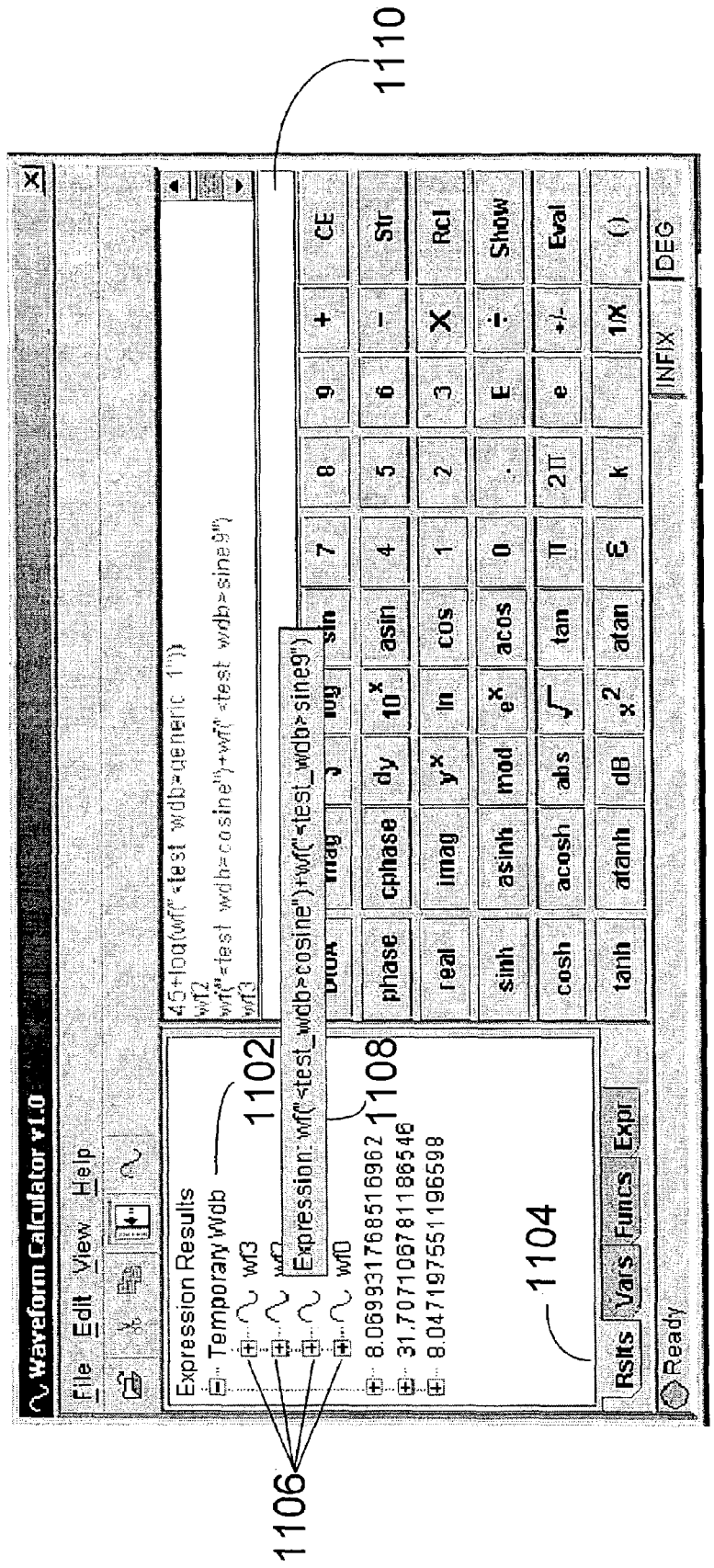
FIG. 11 is another example of a waveform calculator.

FIG. 11 shows another embodiment of a waveform calculator 1100 using a multitude of features of a HTV window. In this figure, a user-defined folder labeled "Temporary Wdb" 1102 is currently expanded to show waveforms wf0-wf3. As already described, each waveform wf0-wf3 can be further expanded by using buttons 1106 to show further information associated with the waveform. In this embodiment, a tool tip 1108 indicates that wf1 is the combination of a <test_wdb>cosine waveform and a <test_wdb>sine 9 waveform. Double-clicking or dropping and dragging may be used to copy these expressions into the data entry window 1110. Additionally, the results 8.069931768516962, 31.707106781186546, and 8.047197551196598 are shown in unexpanded form. Thus, the information associated with these results is hidden in order to save space in the window until the user chooses to expand and view the information.

Figure 12:
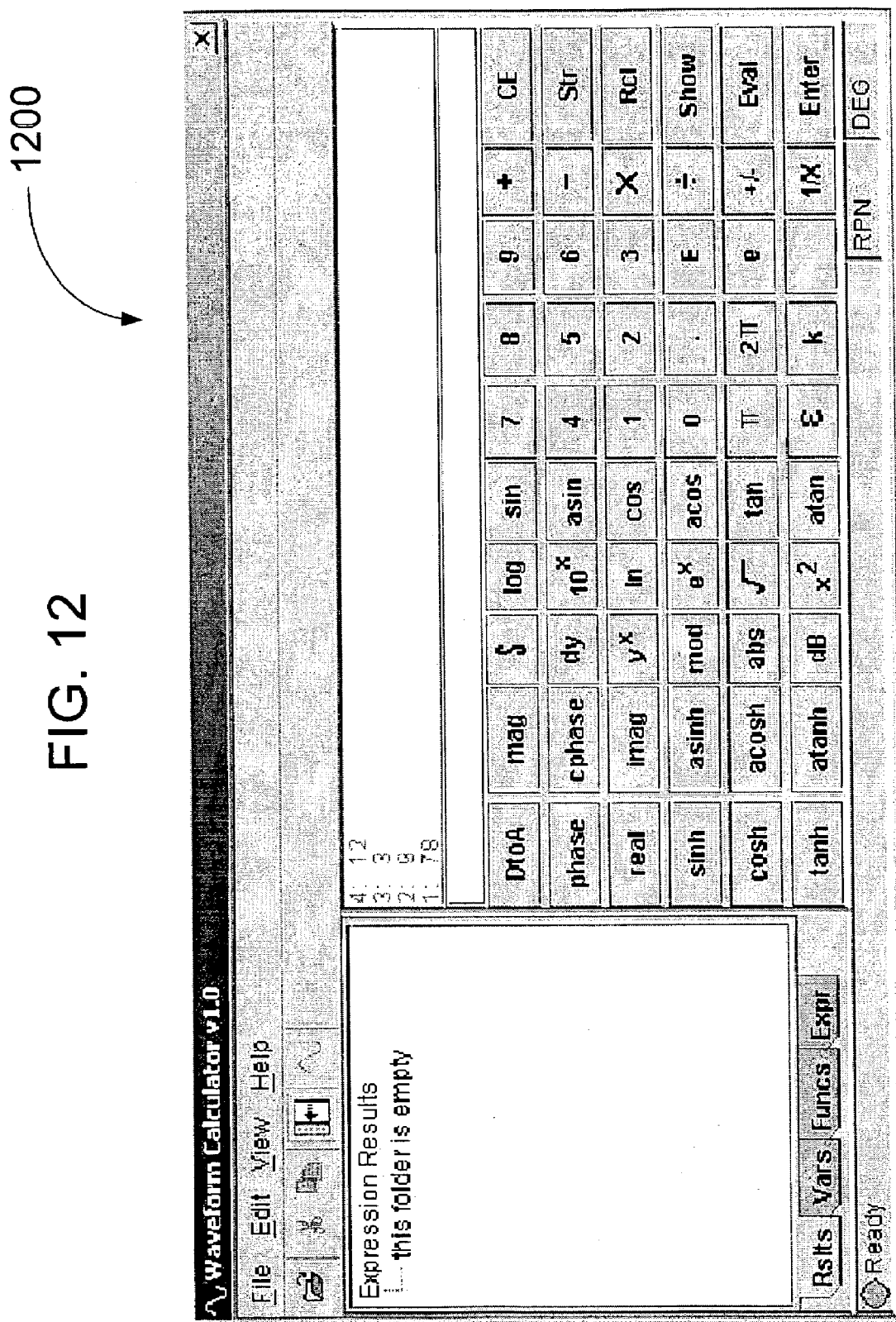
FIG. 12 is a waveform calculator in Reverse Polish Notation (RPN) mode.

FIG. 12 shows another embodiment of a waveform calculator 1200 with a HTV window that supports Reverse Polish Notation (RPN) mode. This mode employs a push-pop technique to load expressions onto and perform functions off of a stack. Referring to FIG. 12, the user has pushed the expressions 12, then 3, then 9, and finally 78 onto the stack. At this point, the stack contains from top to bottom 78, 9, 3, and 12. If an operation is requested by the user, the necessary number of operands are taken from the top of the stack, the operation performed on the operands, and the calculated result placed back on top of the stack.

Figure 13:
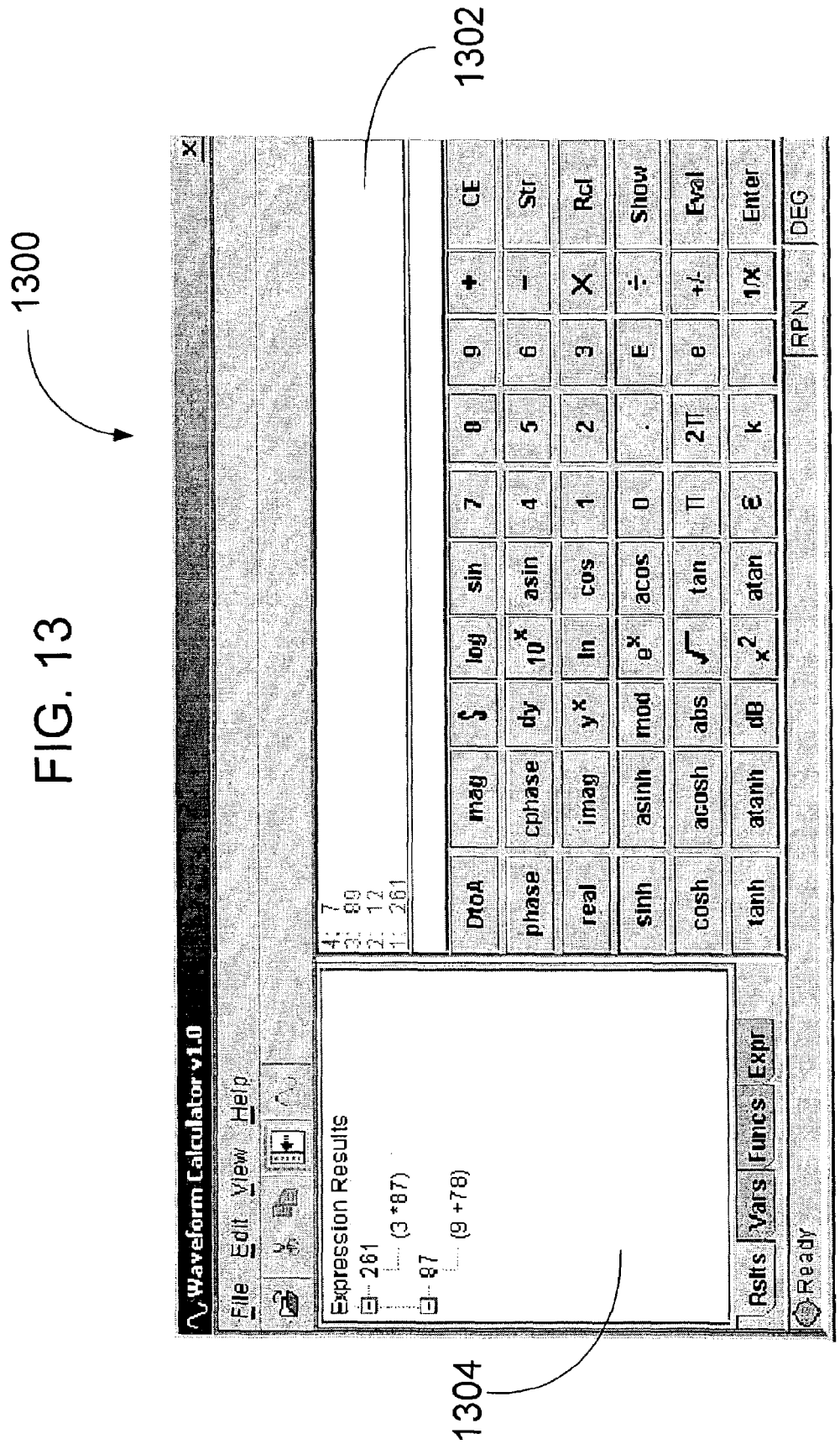
FIG. 13 is a waveform calculator performing user-requested operations in RPN mode.

For instance, assume that addition is the first operation entered by the user once the four expressions in FIG. 12 have been added to the stack as shown in FIG. 13. The number of operands necessary to perform the addition operation are taken from the top of the stack and the addition operation is performed on them. Since 78 and 9 were the last two expressions added to the stack, they are taken off, added together, and the result 87 is calculated and added to the top of the stack. Thus, the stack now contains from top to bottom, 87, 3, and 12. FIG. 13 then shows the user entering the operation multiplication. Thus, the last two numbers pushed onto the stack, 87 and 3, are taken from the stack and multiplied to get a result of 261, which is pushed back onto the stack. Thus, the stack now contains 261 on top of the stack, with the expression 12 next, etc. as shown in the results window 1302. The HTV window 1304 is especially helpful in RPN mode due to the ability to use the results window 1302 to show the current state of the stack while the operations performed along with the results, and expressions used are conveniently available in the HTV window 1304.

The HTV window is also operable to save any displayed data to a file. If the user desires to view or re-use the data, the file may be reopened. This can be a valuable tool to the user who might desire to save frequently used expressions to a file so that they can re-open the file's contents into the expressions tab of the HTV window. Files can also be used to save results or variables of an ongoing project such that they can be re-opened and the user can continue the project where they left off previously. Saving files is also useful for saving time when a number of functions have previously been input through the user interface. Instead of re-entering functions, they can simply be saved and re-opened. The files can be in ASCII format, or any other format capable of saving and recalling text as well known in the art.

Figure 14:
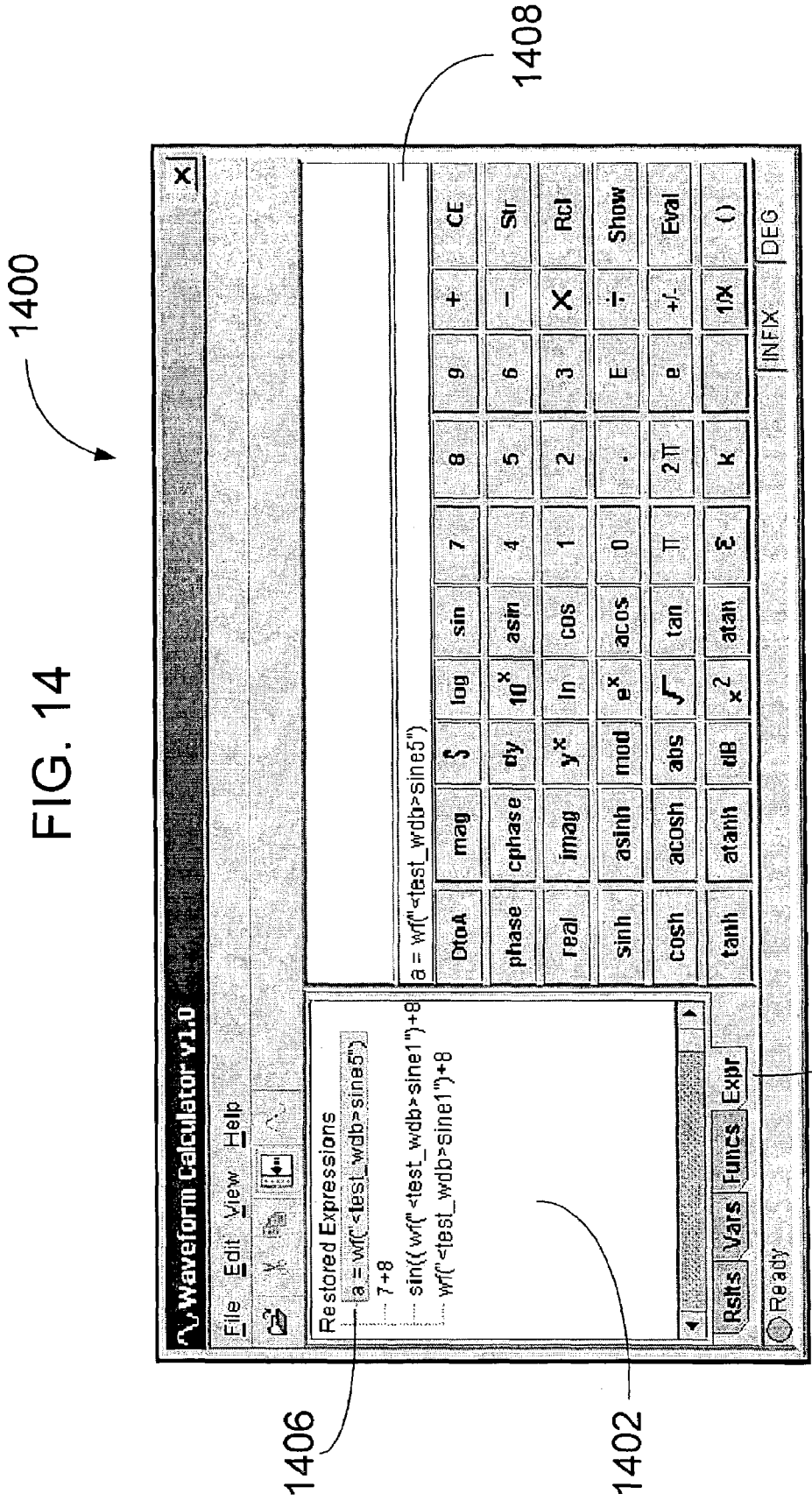
FIG. 14 illustrates saving and re-opening expressions from files.

For example, FIG. 14 is a waveform calculator 1400 with an HTV window 1402 having an expressions tab 1404 for grouping expressions restored from files without associated results. For instance, the expression 1406 could have been saved to a file for any number of reasons. When the user wants to re-use the expression 1406, the file containing the expression 1406 is opened and the expression 1406 is listed under the expressions tab 1404. The expression 1406 can then be viewed, or using the double-click feature, copied into the expression-entry window 1408 as shown in FIG. 14.

Figure 15:
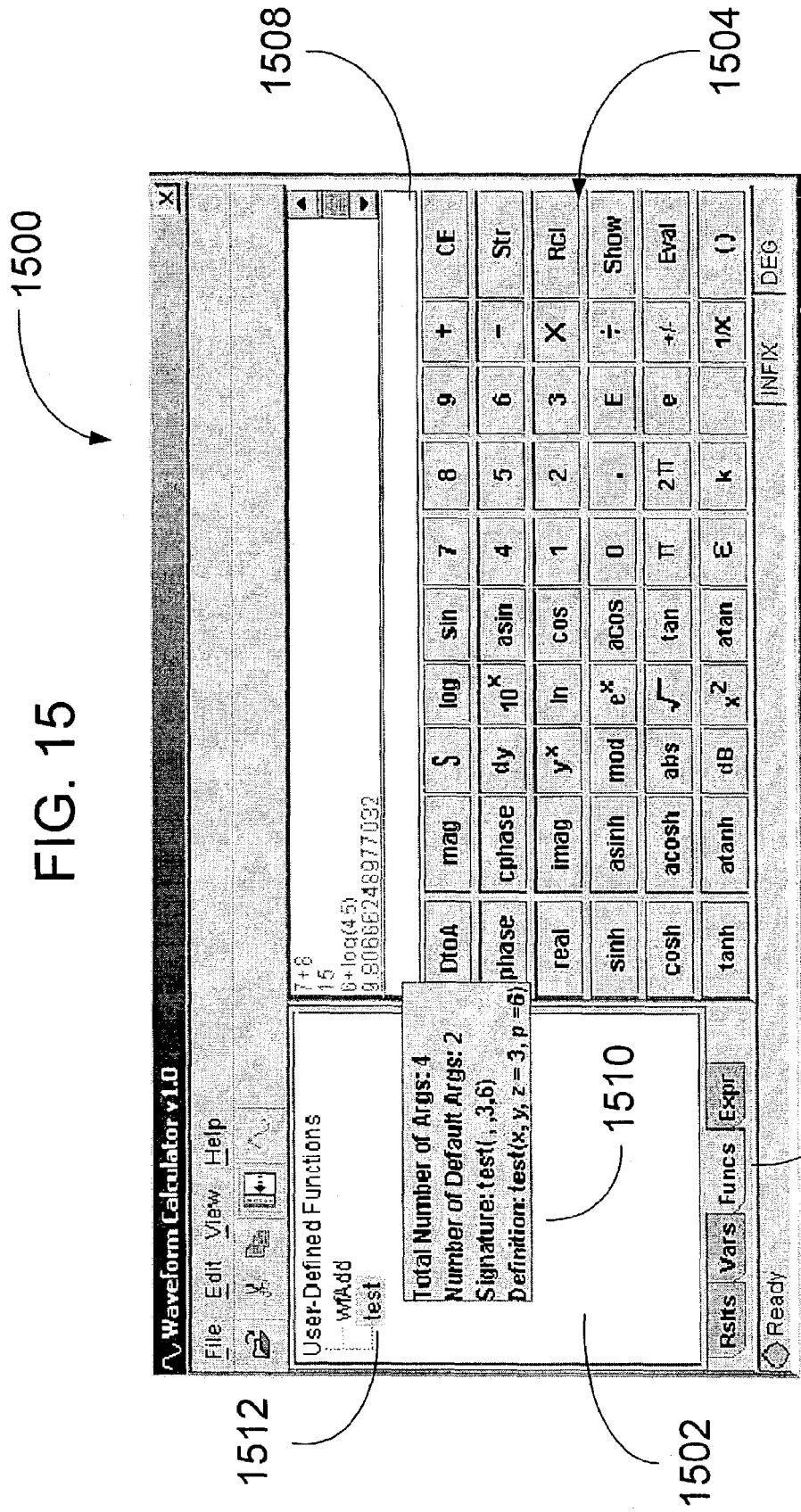
FIG. 15 is a waveform calculator using a HTV window with user-defined scripts and functions.

FIG. 15 shows a waveform calculator 1500 with an HTV window 1502 that allows a user to create and execute custom scripts and functions, and then manipulate those scripts or functions using other various features of the HTV window 1502. If the user desires to perform repetitive, complex mathematical operations on a set of variables, the function or script containing the operations is entered through the user interface 1504 either at the expression-entry window 1508, or by asking the expression evaluator to read and interpret the ASCII file where the function or script has been defined, and the function or script is assigned to an acronym. The function or script is then displayed in the functions tab 1506 of the HTV window 1502. The user can quickly use the function by using the double-click feature or the drag and drop feature to copy the function or script into the expression-entry window 1508. Additionally, a tool tip 1510 can be used to display additional information regarding a script or function. For instance, FIG. 15 shows a function 'test' 1512 has been pointed at to activate a tool tip 1510. The tool tip 1510 contains information such as the total number of arguments, the number of default arguments, a signature, and definition for the function 'test' 1512.

Figure 16:
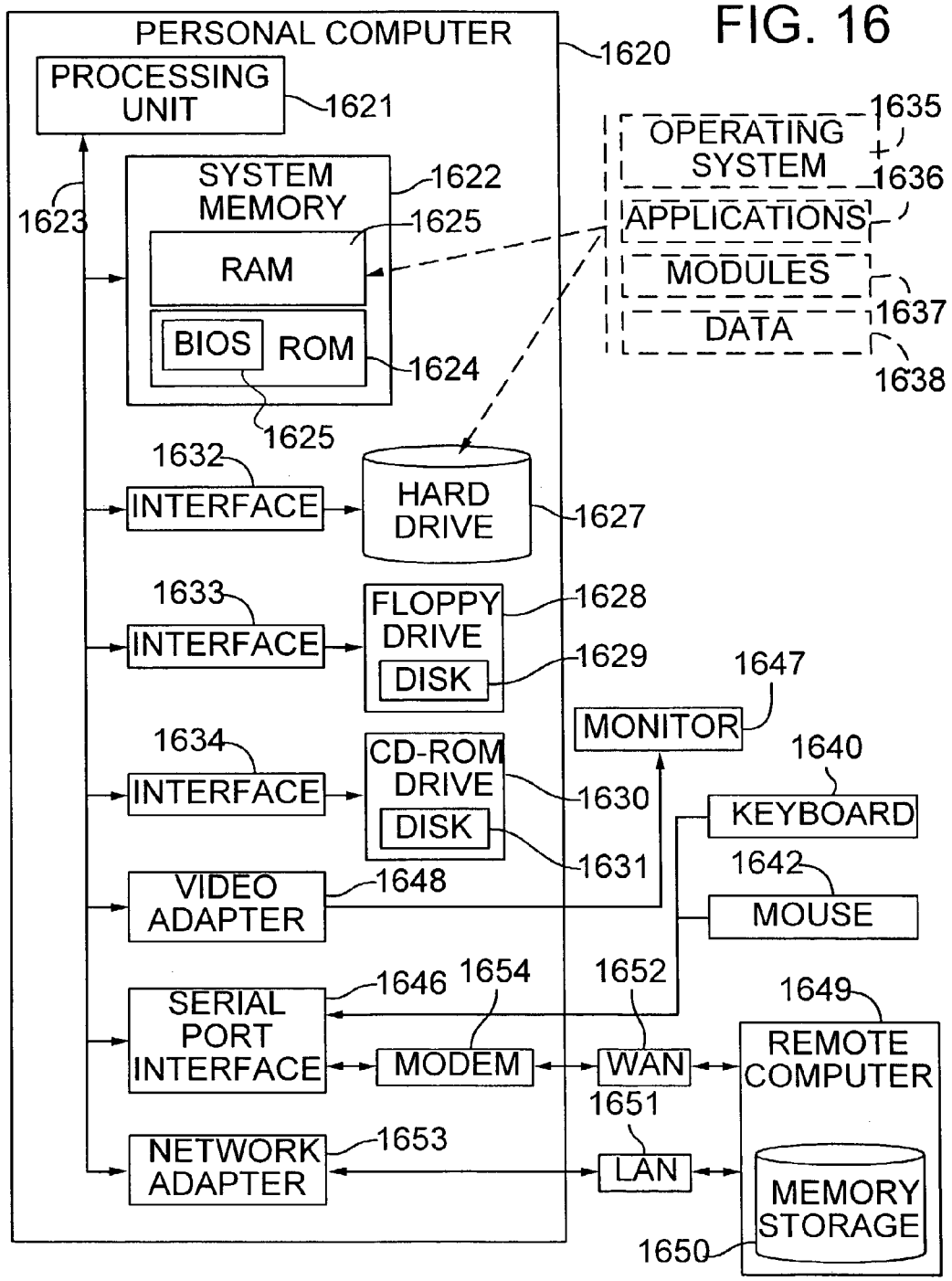
FIG. 16 is a block diagram of a computer system that serves as an operating environment for implementing a waveform calculator.

FIG. 16 illustrates an example of a computer system that serves as an operating environment for an embodiment of a computer-implemented waveform calculator with a HTV window. The computer system includes a personal computer 1620, including a processing unit 1621, a system memory 1622, and a system bus 1623 that interconnects various system components including the system memory to the processing unit 1621. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 1624 and random access memory (RAM) 1625. A basic input/output system 1626 (BIOS), containing the basic routines that help to transfer information between elements within the personal computer 1620, such as during start-up, is stored in ROM 1624. The personal computer 1620 further includes a hard disk drive 1627, a magnetic disk drive 1628, e.g., to read from or write to a removable disk 1629, and an optical disk drive 1630, e.g., for reading a CD-ROM disk 1631 or to read from or write to other optical media. The hard disk drive 1627, magnetic disk drive 1628, and optical disk drive 1630 are connected to the system bus 1623 by a hard disk drive interface 1632, a magnetic disk drive interface 1633, and an optical drive interface 1634, respectively. The drives and their associated computer-readable media provide nonvolatile storage of data, data structures, computer-executable instructions (program code such as dynamic link libraries, and executable files), etc. for the personal computer 1620. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 1625, including an operating system 1635, one or more application programs 1636, other program modules 1637, and program data 1638. A user may enter commands and information into the personal computer 1620 through a keyboard 1640 and pointing device, such as a mouse 1642. Other input devices (not shown) may include a microphone, joystick, game pad, satellite dish, scanner, or the like. These and other input devices are often connected to the processing unit 1621 through a serial port interface 1649 that is coupled to the system bus, but may be connected by other interfaces, such as a parallel port, game port or a universal serial bus (USB). A monitor 1647 or other type of display device is also connected to the system bus 1623 via an interface, such as a display controller or video adapter 1648. In addition to the monitor, personal computers typically include other peripheral output devices (not shown), such as speakers and printers.

The personal computer 1620 may operate in a networked environment using logical connections to one or more remote computers, such as a remote computer 1649. The remote computer 1649 may be a server, a router, a peer device or other common network node, and typically includes many or all of the elements described relative to the personal computer 1620, although only a memory storage device 1650 has been illustrated in FIG. 16. The logical connections depicted in FIG. 16 include a local area network (LAN) 1651 and a wide area network (WAN) 1652. Such networking environments are commonplace in offices, enterprise-wide computer networks, intranets and the Internet.

When used in a LAN networking environment, the personal computer 1620 is connected to the local network 1651 through a network interface or adapter 1653. When used in a WAN networking environment, the personal computer 1620 typically includes a modem 1654 or other means for establishing communications over the wide area network 1652, such as the Internet. The modem 1654, which may be internal or external, is connected to the system bus 1623 via the serial port interface 1646. In a networked environment, program modules depicted relative to the personal computer 1620, or portions thereof, may be stored in the remote memory storage device. The network connections shown are merely examples and other means of establishing a communications link between the computers may be used.

Having illustrated and described the principles of the illustrated embodiments, it will be apparent to those skilled in the art that the embodiments can be modified in arrangement and detail without departing from such principles.

For example, although the illustrated embodiments describe a computer-implemented waveform calculator, the claimed invention is not so limited. The features described could be implemented on any calculator that could benefit from a more efficient display, such as a hand-held calculator or non-waveform calculator.

In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

We claim:

1. A method of displaying in a calculator, comprising:
   receiving a first mathematical expression in an expression entry area on the calculator;
   displaying results in a first window on the calculator, wherein the results displayed in the first window comprise a result for the first mathematical expression;
   displaying, in a second window on the calculator, a usage history comprising the first mathematical expression, a second mathematical expression, and results displayed in the second window, wherein the results displayed in the second window comprise the result for the first mathematical expression and a result for the second mathematical expression, wherein the usage history is displayed in a hierarchical tree such that a result for a given mathematical expression is displayed in the second window on a different hierarchical level than the given mathematical expression; and
   displaying organizational tabs for the second window, wherein each organizational tab is operable to display a given category of data associated with the usage history, and
   wherein the results in the first window and the results in the second window are displayed simultaneously.

2. The method of claim 1, wherein the hierarchical tree has the result for the given mathematical expression as a parent level of the tree and the given mathematical expression as a child level of the tree.

3. The method of claim 1, further including copying the second mathematical expression from the second window to the first window in response to a drag and drop operation.

4. The method of claim 1, further including copying the second mathematical expression from the second window to the first window in response to double clicking on the second mathematical expression.

5. The method of claim 1, further including displaying different types of graphical icons in the second window in association with the first and second mathematical expressions, the type of graphical icons being associated with a data type of the first and second mathematical expressions.

6. The method of claim 1, wherein the given mathematical expression is displayed on a parent level and the result for the given mathematical expression is displayed on a child level under the given mathematical expression.

7. The method of claim 1, wherein one of the organizational tabs is associated with variables used in the first and second mathematical expressions and further including organizing the hierarchical tree such that variables are displayed at the parent level.

8. The method of claim 1, further including displaying a popup window overlapping the first or second window when a pointing device points to the first or second mathematical expression or the result for the first or second mathematical expression to provide further information associated with the first or second mathematical expression or the first or second result.

9. The method of claim 1, further including automatically generating folders based on a type of the first result or the second result, and storing the first result or the second result in a folder corresponding to the type.

10. The method of claim 1, wherein the calculator is a waveform calculator.

11. The method of claim 1, wherein the calculator processes waveforms used to simulate an electronic circuit.

12. The method of claim 1, wherein the calculator is displayed on a computer monitor.

13. The method of claim 1, wherein the hierarchical tree has parent levels and child levels, the parent levels being expandable to display the child levels and collapsible to hide the child levels.

14. A computer-readable storage medium storing computer-executable instructions that when executed by a computer cause the computer to perform a method on a calculator display generated on a limited region of a screen, the method comprising:
   receiving a first mathematical expression in an expression entry area on a calculator;
   displaying results in a first window on the calculator, wherein the results displayed in the first window comprise a result for the first mathematical expression;
   displaying, in a second window on the calculator, a usage history comprising the first mathematical expression, a second mathematical expression, and results displayed in the second window, wherein the results displayed in the second window comprise the result for the first mathematical expression and a result for the second mathematical expression, wherein the usage history is displayed in a hierarchical tree such that a result for a given mathematical expression is displayed in the second window on a different hierarchical level than the given mathematical expression; and
   displaying organizational tabs for the second window, wherein each organizational tab is operable to display a given category of data associated with the usage history, and
   wherein the results in the first window and the results in the second window are displayed simultaneously.

15. A method for displaying usage history of a calculator, the calculator having a user interface, the method comprising:
   receiving a first mathematical expression in an expression entry area on the calculator:
   displaying a result in a first window on the calculator, wherein the result displayed in the first window comprises a result for the first mathematical expression;
   displaying, in a second window on the calculator, a usage history comprising the first mathematical expression, a second mathematical expression, and results, wherein the results displayed in the second window comprise the result for the first mathematical expression and a result for the second mathematical expression, wherein the usage history is displayed in a hierarchical tree such that a result for a given mathematical expression is displayed on a different hierarchical level than the given mathematical expression; and
   displaying organizational tabs for the second window, wherein each organizational tab is operable to display a given category of data associated with the usage history, wherein the hierarchical tree is expandable and collapsible, and
   wherein the hierarchical tree can be expanded and collapsed while the result is displayed in the first window.

16. The method of claim 15 further comprising displaying an expression in a temporary window in response to pointing to a result associated with the expression.

17. The method of claim 15 further comprising using graphical icons to associate an expression in the second window with a type of expression.

18. The method of claim 15 further comprising displaying folders to group the first and second mathematical expressions according to expression types.

19. The method of claim 18 wherein displaying folders comprises:

displaying a folder in the second window automatically when a particular expression is to be displayed;

placing the particular expression in the folder rather than displaying it in the second window; and subsequently placing expressions of the same type in the folder.

20. The method of claim 15 wherein the given category of data associated with the usage history comprises one or more of the following: results, variables, functions, and expressions.

21. The method of claim 15 wherein an expression can be re-used in response to double-clicking on the expression.

22. The method of claim 15 wherein an expression can be re-used in response to dragging and dropping the expression.

23. The method of claim 15 wherein an expression can be selected by a user and saved into a file.

24. The method of claim 15 wherein at least one of the results displayed in the second window comprises a waveform and at least one of the first and second mathematical expressions comprises an expression represented by the waveform.

25. The method of claim 15 wherein at least one of the results displayed in the second window comprises a variable and at least one of the first and second mathematical expressions comprises the value currently assigned to the variable.

26. The method of claim 15 wherein the calculator is a waveform calculator.

27. A calculator comprising:

an expression entry area operable to receive mathematical expressions;

a first display area that displays at least some results from evaluating the received mathematical expressions;

a second display area operable to display a usage history, the usage history comprising the at least some results from evaluating the received mathematical expressions and the received mathematical expressions, wherein the usage history is displayed in a hierarchical format, wherein the results are displayable on a parent level that is expandable to display the received mathematical expressions on a sub-level, wherein the first and the second display areas are non-overlapping display areas, and wherein the calculator is configured to simultaneously display in the second display area results displayed in the first display area; and an organizational tab area operable to display organizational tabs for the second display area, wherein each organizational tab is operable to display a given category of data associated with the usage history.

28. The calculator of claim 27 wherein the expressions are displayed in a pop-up window in response to pointing at the results.

29. The calculator of claim 27 wherein graphical icons classify results by result type.

30. The calculator of claim 27 wherein folders can be used to group the results or expressions with similar types of results or expressions.

31. The calculator of claim 27 wherein the results and expressions can be re-used through drag and drop operations.

32. The calculator of claim 27 wherein the results and expressions can be re-used through double-clicking operations.

33. The calculator of claim 27 wherein the expressions and results are selectable by a user and savable to a file.

34. The calculator of claim 27 wherein the results include at least one waveform and the expressions comprise at least one expression represented by the at least one waveform.

35. The calculator of claim 27 wherein the results include at least one variable and the expressions comprise at least one expression representing the value assigned to the at least one variable.

36. A computer-readable storage medium storing computer-executable instructions that when executed by a computer cause the computer to generate a calculator display on a limited region of a screen, the calculator display comprising:

an expression entry area operable to receive a first mathematical expression;

a first display area configured to display a result for at least the first mathematical expression received in the expression entry area;

a second display area operable to display a usage history comprising the first mathematical expression, a second mathematical expression, and results, wherein the results displayed in the second display area comprise the result for the first mathematical expression and a result for the second mathematical expression, wherein the usage history is displayed in a hierarchical format such that a result for a given mathematical expression is displayed on a different hierarchical level than the given mathematical expression, and wherein the first and the second display areas are non-overlapping display areas; and an organizational tab area operable to display organizational tabs for the second display area, wherein each organizational tab is operable to display a given category of data associated with the usage history.

37. A calculator comprising:

a means for a user to enter a first mathematical expression;

a means for displaying a result for the first mathematical expression in a first display area;

a means for displaying a usage history in a second display area, the usage history comprising the first mathematical expression, a second mathematical expression, and results, wherein the results displayed in the second display area comprise the result for the first mathematical expression and a result for the second mathematical expression, wherein the usage history is displayed in a hierarchical tree such that a result for a given mathematical expression is displayed on a different hierarchical level than the given mathematical expression; and a means for displaying a plurality of organizational tabs for the second display area, wherein each organizational tab is operable to display a given category of data associated with the usage history and at least one of the mathematical expression and the result.

38. The method of claim 1, wherein the first and the second window are non-overlapping windows.

39. The method of claim 1, further comprising displaying a user input in a third window.

40. The method of claim 1, further comprising displaying the result or the expression in a third window through a drag and drop operation from the second window.

41. The method of claim 1, further comprising displaying the result or the expression in a third window by double clicking on the result or the expression in the second window.

42. The method of claim 1, wherein the given mathematical expression is displayed on a first parent level and the result for the given mathematical expression is displayed on a first child level when a first tab is selected, and wherein the result for the given mathematical expression is displayed on a second parent level and the given mathematical expression is displayed on a second child level when a second tab is selected.

43. The method of claim 15, wherein the plurality of previously displayed results and the plurality of associated expressions are associated with a waveform calculation performed by the calculator.

44. The method of claim 15, further comprising:
performing a waveform calculation based on an input displayed in a third window adjacent to the first window.

45. The method of claim 44, further comprising:
copying one of the plurality of previously displayed results or the plurality of associated expressions from the second window to the third window through a drag and drop operation, wherein the input is the copied result or expression.

46. The method of claim 44, further comprising:
copying one of the plurality of previously displayed results or the plurality of associated expressions from the second window to the third window by double clicking on the result or the expression, wherein the input is the copied result or expression.

47. The method of claim 15, wherein the hierarchical tree is a first hierarchical tree displayed in a first folder, the first hierarchical tree having the plurality of expressions displayed at a parent level and the plurality of results displayed at a child level, the method further comprising:
displaying a second hierarchical tree in a second folder having the plurality of expressions displayed at the child level and the plurality of results displayed at the parent level.

48. The calculator of claim 27, further comprising:
a third display area operable to display a user entry, wherein the evaluating mathematical expressions is based on the user entry.

49. The calculator of claim 48, wherein the third display area is further operable to display results or expressions copied from the second display area.

* * * * *